United States Patent

[11] 3,609,127

| [72] | Inventor | Vincent Matthews |
| | | Manchester, England |
| [21] | Appl. No. | 731,317 |
| [22] | Filed | May 22, 1968 |
| [45] | Patented | Sept. 28, 1971 |
| [73] | Assignee | Imperial Chemical Industries Limited |
| | | London, England |
| [32] | Priority | May 25, 1967 |
| [33] | | Great Britain |
| [31] | | 24420/67 |

[54] PREPARATION OF POLYMERISABLE POLYCARBONAMIDE COMPOSITION
9 Claims, No Drawings

[52] U.S. Cl. .................................................. 260/78 SC,
260/29.2 N, 260/2.3 R, 260/78 R, 260/96 D
[51] Int. Cl. ........................................................ C08g 20/38
[50] Field of Search .......................................... 260/78 SC,
2.3, 29.2 N, 96 D

[56] References Cited
UNITED STATES PATENTS

| 2,343,174 | 2/1944 | Edison et al. ................. | 260/78 |
| 2,951,777 | 9/1960 | Zimmerman ................. | 260/78 |

*Primary Examiner*—Harold D. Anderson
*Attorney*—Leonard Horn

ABSTRACT: A process for the manufacture of a polymerisable composition comprising water, a low molecular weight polyamide derived from a first diamine having from 2 to 12 carbon atoms and a first dicarboxylic acid having from 6 to 12 carbon atoms, and the salt of a second said diamine with a second said dicarboxylic acid, which process comprises heating a high molecular weight polyamide derived from the first said diamine and the first said dicarboxylic acid with an aqueous solution of the second said dicarboxylic acid and neutralizing the resulting solution with the second said diamine.

PREPARATION OF POLYMERISABLE POLYCARBONAMIDE COMPOSITION

This invention relates to polymerizable compositions, and more particularly it relates to compositions polymerizable to polyamides and to methods for manufacturing such compositions.

The polyamides to which the compositions made by the process of our invention polmerizable polmerizable are the synthetic linear polyamides obtainable by the polycondensation of diamines with dicarboxylic acids. The polmerizable compositions comprise in aqueous solution a mixture of a low molecular weight polyamide and a salt of a diamine with a dicarboxylic acid. We have found that such polmerizable compositions are obtainable if a high molecular weight polyamide is heated with an aqueous solution of a dicarboxylic acid at elevated temperature and the resulting aqueous solution is neutralized with a diamine.

The invention provides a process for the manufacture of a polymerizable composition comprising water, a low molecular weight polyamide derived from a first diamine having from 2 to 12 carbon atoms and a first dicarboxylic acid having from 6 to 12 carbon atoms, and the salt of a second said diamine with a second said dicarboxylic acid, which process comprises heating a high molecular weight polyamide derived from the first said diamine and the first said dicarboxylic acid with an aqueous solution of the second said dicarboxylic acid and neutralizing the resulting solution with the second said diamine.

By a low molecular weight polyamide we mean a polyamide having an average molecular weight less than about 1,000. By a high molecular weight polyamide we mean a polyamide having an average molecular weight greater than about 4,000.

The diamines from which the polyamides and the salts in the process of our invention are derived, and which are used in the neutralization step of our process, have from 2 to 12 carbon atoms. Particularly suitable are alkylenediamines especially those represented by the formula $NH_2.CnH_{2n}NH_2$ where $n$ is an integer from 2 to 12. Examples of such alkylenediamines include ethylenediamine, propylenediamine, tetramethylenediamine, pentamethylenediamine, hexamethylenediamine, 2- and 3-methylhexamethylenediamine, 2,2,4- and 2,4,4-trimethylhexamethylenediamine, octamethylenediamine, decamethylenediamine and dodecamethylenediamine.

Also suitable are diamines which may be represented by the general formula $NH_2$-alkylene-arylene-alkylene-$NH_2$ and which normally have at least 8 carbon atoms, for example $m$-xylylenediamine and $p$-xylylenediamine, and diamines which may be represented by the general formula $NH_2$-alkylene-cycloalkylene-alkylene-$NH_2$ and which normally have at least 6 carbon atoms, for example 1,3- and 1,4-bis(aminomethyl) cyclohexane.

The dicarboxylic acids from which the polyamides and the salts in the process of our invention are derived, and which are used in aqueous solution in the heating step of our process, have from 6 to 12 carbon atoms. Particularly suitable are alkylenedicarboxylic acids especially those represented by the formula $CO_2H.CmH_{2m}.CO_2H$ where $m$ is an integer from 6 to 12. Examples of such alkylenedicarboxylic acids include adipic acid, suberic acid, azelaic acid, 2,2,4-trimethyladipic acid, sebacic acid and dodecanedioic acid.

Where the first diamine and the second diamine are identical, and where the first dicarboxylic acid and the second dicarboxylic acid are also identical, the polmerizable compositions are polymerizable to a homopolymer. Where the first and second diamines are different, or where the first and second dicarboxylic acids are different, the polymerizable compositions are polmerizable to a copolymer.

In the process of our invention the aqueous solution of the second dicarboxylic acid hydrolyses the high molecular weight polyamide to the low molecular weight polyamide of the polmerizable composition, and subsequent neutralization of the second dicarboxylic acid with the second diamine forms the salt of the polmerizable composition.

The high molecular weight polyamides used as starting materials in the process of our invention are those derived from the first diamine and the first dicarboxylic acid. Suitable polyamides are polyethylene adipamide, polytetramethylene adipamide, polypentamethylene adipamide, polyhexamethylene adipamide, poly-2,2,4-trimethylhexamethylene adipamide, polyhexamethylene suberamide, polyhexamethylene 2,2,4-trimethyladipamide, polyhexamethylene sebacamide polyhexamethylene dodecanediamide, polyoctamethylene adipamide, polydodecamethylene adipamide, poly-$m$-xylylene adipamide and poly-$p$-xylylene adipamide. The high molecular weight polyamide may be in any suitable form, for example it may be in powder form, in the form of lumps, or in the form of shaped articles such as textile fibers.

In carrying out the process of our invention it is convenient to add the high molecular weight polyamide to an aqueous solution of the second dicarboxylic acid and to heat the mixture. The temperature of heating should normally be at least 150° C., and this normally involves carrying out the reaction under pressure, for example in an autoclave. While no upper limit of temperature can be set it is not normally advantageous to exceed 300° C. A very useful temperature range is between 190° C. and 230° C. Agitation of the reaction mixture is desirable. The time of heating is that required to effect, at the chosen temperature, the desired degree of hydrolysis of the high molecular weight polyamide to the low molecular weight polyamide. Normally heating is continued for at least 30 minutes. The upper limit of the time of heating may be determined by economic consideration, or by the fact that prolonged heating may result in the breakdown of the polyamide to undesired byproducts. Normally it is not necessary to heat for longer than 6 hours.

The ratio of dicarboxylic acid to high molecular weight polyamide is usually at least 50:50 by weight. A very useful ratio is approximately 65:35, but very much higher ratios, for example 90:10 or even higher, may of course be used if desired. The ratio of water to dicarboxylic acid may vary widely. Normally it is at least 50:50 by weight, but very much higher ratios may be used if desired, for example 90:10 or even higher. A very useful ratio is approximately 70:30. The product of the heating step is an aqueous slurry containing low molecular weight polyamide and dicarboxylic acid. If the proportion of water in the slurry is too low it becomes too thick to handle, and although this difficulty may be overcome by diluting the slurry with water after the heating step, we normally prefer the ratio of water to combined polyamide and dicarboxylic acid to be at least 55:45 by weight. A very useful ratio, giving a slurry not normally subject to handling difficulties, is 60:40. It is an advantage of the process of our invention that the aqueous solutions of dicarboxylic acids which we use are less corrosive to metals, such as stainless steel, used in the construction of reaction vessels than are the molten dicarboxylic acids in the absence of water. Moreover, the dicarboxylic acids are less liable to decompose in aqueous solution than they are in the absence of water.

At the end of the heating step the aqueous slurry, which is the product of that step, is cooled and neutralized with the second diamine. Where the heating step has been carried out in an autoclave it is usual to cool the contents somewhat and release the pressure before neutralization. Neutralization is effected to a pH of approximately 7, using a pH meter or a suitable indicator to determine the end point. The diamine may be used as such or as an aqueous solution. The temperature of neutralization is not critical, but it may be convenient to neutralize the aqueous slurry while it is still hot, for example at a temperature of about 100° C. The neutralization product is the polmerizable composition of the invention. If desired it may be treated in various ways before polymerization. For example, it may be filtered, or treated with decolorizing carbon and then filtered, and other materials may be added to the composition as desired.

The polymerizable compositions of our invention, containing water, low molecular weight polyamide and the salt of a dicarboxylic acid with a diamine may be converted into high molecular weight polyamides by methods which are already known for the conversion of aqueous solutions of such salts to such polyamides. Thus the polymerizable composition may be heated so that the water present evaporates, and polycondensation of the salt and of the low molecular weight polyamide ensues with liberation of water which also evaporates. Final heating temperatures of the order of 200° to 300° C. are required and the operation may be carried out at atmospheric pressure or under pressure depending on the nature of the product desired.

Where in the process of our invention the first and second diamines are identical and the first and second dicarboxylic acids are also identical, the polmerizable composition is polymerizable to a high molecular weight polyamide of the same nature as the high molecular weight polyamide used as the starting material in the process. However, although in this embodiment of our invention the products of the process are convertible into materials similar to the starting materials, this embodiment may be usefully exploited in a number of ways. Thus, the polymerizable compositions, which are generally in the form of thick syrups when hot, may be used as coating compositions which may be cured by a heat treatment to give a coating of high molecular weight polyamide, which of course is in a different form from the polyamide used as starting material.

A further very valuable use for the process of our invention is in recovering waste polyamide. In the manufacture of polyamides and of shaped articles formed from polyamides material is sometimes produced which, for one reason or another, is unsuitable for its intended purpose. Thus the polyamide may have too low or too high a molecular weight, it may be discolored or it may contain contaminants. Moreover, in the conversion of polyamides into fibers there is inevitable production of waste in the form of broken threads and the like. The materials used in the manufacture of polyamides are often quite expensive, and the reconversion of useless waste material into usable polyamide is, therefore, a desirable objective. Accordingly, one embodiment of the process of our invention involves the recovery of waste polyamide, by converting it, as described hereinbefore, to a polymerizable composition, and then converting the composition to a high molecular weight polyamide free from the defects of the starting material. In this recovery process it may be, and usually is, desirable to introduce one or more purification steps. A simple filtration, for example, introduced after the neutralization step of the process, may be sufficient to remove some contaminants. Alternatively, or in addition, the aqueous solution of the low molecular weight polyamide may be treated with decolorizing carbon or with some other absorbent for impurities, for example a diatomaceous earth, and then filtered. Volatile impurities formed during the hydrolysis to the low molecular weight polyamide, for example monocarboxylic acids (e.g. acetic acid) used as viscosity stabilizers in the initial polycondensation to the high molecular weight polyamide starting material, and bound in the polyamide as acyl groups until liberated by hydrolysis, may be removed by distilling them out. The volatile impurities may be removed along with steam liberated from the autoclave when the pressure is released at the end of the heating step. Alternatively, steam may deliberately be blown through the aqueous slurry resulting from the heating step, so effecting volatilization of impurities. The reconversion of the resulting polymerizable composition to polyamide is affected by the process hereinbefore described, any desired additions being made to the composition or during the polymerization itself. Such additions might include viscosity stabilizers, for example acetic acid, pigments, for example titanium dioxide, light stabilizers, for example manganese compounds, heat stabilizers, for example copper salts, or antioxidants.

The recovery process of our invention is also applicable to certain copolymers of the high molecular weight polyamides as hereinbefore defined. For example, where a major proportion of hexamethylenediamine and adipic acid is copolymerized with a minor proportion of caprolactam, so giving a copolymer containing a major proportion of polyhexamethylene adipamide and a major proportion of polycaprolactam, and the resulting copolymer is heated with an aqueous solution of adipic acid and the product then neutralized with hexamethylene diamine, the resulting polymerizable composition, after any desired purification treatments, is polymerizable to a copolymer of polyhexamethylene adipamide and polycaprolactam similar to that which was hydrolyzed, and if an addition of a suitable amount of caprolactam is made to the polymerizable composition, it is polymerizable to copolymer having the same proportions of polyhexamethylene adipamide to polycaprolactam as that which was hydrolyzed. The recovery process is also applicable to mixtures of high molecular weight polyamides as hereinbefore defined, obtained for example by melt blending, for example a mixture of polyhexamethylene adipamide and polhexamethylene sebacamide.

The invention is illustrated but not limited by the following Examples in which the parts and percentages are by weight.

EXAMPLE 1

420 Parts of waste polyhexamethylene adipamide of approximate molecular weight 20,000 in the form of chip, 780 parts of adipic acid and 1,800 parts of water are charged to an autoclave which is sealed, heated to 200° C. with agitation, and maintained at that temperature for 4 hours. The contents of the autoclave are cooled somewhat, the pressure reduced to that of the atmosphere, the autoclave opened, and 60 percent aqueous hexamethylenediamine solution (1,033 parts) added until the pH is 7.6. Eight Parts of a decolorizing carbon are added and the suspension filtered at 100° C.

7,800 parts of polymerizable composition obtained as above and 15.3 parts of 26.4 percent aqueous acetic acid solution were heated in an autoclave to a temperature of about 215° C. and a pressure of 250 lb. per square inch. The heating was continued and the pressure maintained at 250 lb. per square inch by bleeding off steam. When a temperature of 240° C. was reached, the pressure was gradually reduced to atmospheric during 60 minutes, after which time the temperature had risen to about 270° C. As soon as atmospheric pressure was reached a slow stream of nitrogen was passed through the autoclave, after 10 minutes further agitation the polymer was extruded from the autoclave under nitrogen pressure as a ribbon and quenched with water.

EXAMPLE 2

210 Parts of waste polyhexamethylene adipamide, 390 parts of adipic acid, 900 parts of water, 15 parts of decolorizing carbon and 15 parts of a diatomaceous earth as filter aid are charged to an autoclave which is sealed, heated to 200° C. with agitation, and maintained at that temperature for 4 hours. The contents of the autoclave are cooled somewhat, the pressure reduced to that of the atmosphere, the autoclave opened and 60 percent aqueous hexamethylene diamine solution (520 parts) added. The temperature of the neutralized hydrolysate was brought to 100° C. and filtered.

700 Parts of the polymerizable composition obtained as above were heated in an autoclave to a temperature of about 215° C. and a pressure of 250 lbs. per square inch. The heating was continued and the pressure maintained at 250 lbs. per square inch by bleeding off steam. When a temperature of 240° C. was reached, the pressure was gradually reduced to that of the atmosphere during 60 minutes, after which time the temperature had risen to about 270° C., this temperature was maintained for a further 10 minutes before the polymer was extended from the autoclave under nitrogen pressure as a ribbon and quenched with water. The resulting polymer had a relative viscosity of 29 (8.4 percent solution in 90 percent formic acid).

EXAMPLE 3 a. 175 Parts of nylon 6.6 waste, 325 parts of adipic acid and 675 parts of water, are charged to an autoclave which is sealed, heated to 200° C. with agitation, and maintained at that temperature for 4 hours. The contents are cooled to about 90° C. and the resulting mixture neutralized with 60 percent aqueous hexamethylene diamine solution. To the neutral mixture are added 10 parts of decolorizing carbon and 10 parts of a diatomaceous earth as filter aid, the mixture was agitated at 90° C. for 1.5 hours and then filtered at 90° C. b. 650 Parts of polymerizable composition obtained as above were heated in an autoclave temperature of about 215° C. and a pressure of 250 lbs. per square inch. The heating was continued and the pressure maintained at 250 lbs. per square inch by bleeding off steam. When the temperature reached 240° C. the pressure was reduced to atmospheric over 60 minutes after which the temperature had risen to 275° C., this temperature was maintained for 30 minutes before the polymer was extruded from the autoclave as a ribbon and quenched with water. The relative viscosity of the finished polymer was 28 (8.4 percent solution in 90 percent formic acid).

c. 650 Parts of polymerisable composition, obtained as in 3a above, and 2.66 parts of 60 percent aqueous hexamethylene diamine solution were processed as in 3b above. The resulting polymer had a relative viscosity of 31 (8.4 percent solution in 90 percent formic acid) and was of good color.

d. 2,660 Parts of polymerizable composition obtained as in 3a above, and 5.4 parts of 60 percent aqueous hexamethylene diamine solution were processed as in 3b above except when the temperature had risen to 275° C. this temperature was maintained for 20 minutes before the polymer was extruded. The resulting polymer had a relative viscosity of 39 (8.4 percent solutions in 90 percent formic acid) and was of good color.

EXAMPLE 4

7 Parts of polyhexamethylene sebacamide, 13 parts of sebacic acid and 27 parts of water contained in a sealed, evacuated, heavy walled glass tube were heated to 200° C. and kept at this temperature for 4 hours. The tube and contents was allowed to cool to room-temperature before the tube was opened. The contents of the tube were transferred to a suitable vessel and 12.5 parts of aqueous hexamethylene diamine solution added, the resulting mixture was heated to 100° C. and filtered.

The composition obtained as above was concentrated by heating in a slow-stream of nitrogen gas at 100° C. for 30 minutes, the resulting concentrate was further heated with stirring to 290° C. over 45 minutes. The polymer obtained was of good color with a relative viscosity of 20.

Preparations of polymerizable compositions similar to the above were carried out using in place of polyhexamethylene sebacamide 7 parts of the polyamide shown in column 1 of the annexed table. In place of the sebacic acid was used 13 parts of dicarboxylic acid shown in column 2 of the Table and in place of the hexamethylene diamine the diamine shown in column 3 of the Table was used.

TABLE

| Example Number | Column 1 | Column 2 | Column 3 |
|---|---|---|---|
| 5 | Poly(m-xylylene adipamide). | Adipic acid. | 12 parts m-xylylene diamine. |
| 6 | Poly(p-xylylene dodecanediamide). | Dodecanedioic acid. | 7.7 parts of p-xylylenediamine. |
| 7 | Copolymer of polyhexamethylene adipamide and polycaprolactam (95/5 ratio). | Adipic acid. | 17.2 parts of 60% aqueous hexamethylene diamine solution. |

We claim:

1. A process for the manufacture of a polymerisable composition comprising water, a low molecular weight polyamide of average molecular weight less than about 1000 produced by condensing a first diamine having from 2 to 12 carbon atoms selected from the class consisting of alkylenediamines represented by the formula $NH_2.CnH_{2n}NH_2$ where $n$ is an integer from 2 to 12, diamines represented by the formula $NH_2$-alkylene-arylene-alkylene-$NH_2$ and which contain at least 8 carbon atoms and diamines represented by the formula $NH_2$-alkylene-cycloalkylene-alkylene-$NH_2$ which contains at least 6 carbon atoms, and a first alkylene-dicarboxylic acid represented by the formula $CO_2H.CmH_{2m}.CO_2H$ where $m$ is an integer from 6 to 12, and the salt of a second said diamine with a second said dicarboxylic acid, which process comprises heating a high molecular weight polyamide of average molecular weight greater than about 4000 produced by condensing the first said diamine and the first said dicarboxylic acid with an aqueous solution of the second said dicarboxylic acid at a temperature of at least 150° C. for at least 30 minutes and neutralizing the resulting solution with the second said diamine to a pH of approximately 7, the ratio of dicarboxylic acid to high molecular weight polyamide being at least 50:50 by weight, and the ratio of water to dicarboxylic acid being at least 50:50 by weight.

2. The process of claim 1 in which the first diamine and the second diamine are identical and the first dicarboxylic acid and the second dicarboxylic acid are also identical.

3. The process of claim 1 in which the ratio of dicarboxylic acid to high molecular weight polyamide is approximately 65:35 by weight.

4. The process of claim 1 in which the ratio of water to dicarboxylic acid is approximately 70:30 by weight.

5. The process of claim 1 in which the ratio of water to combined polyamide and dicarboxylic acid is at least 55:45 by weight.

6. The process of claim 5 in which the ratio of water to combined polyamide and dicarboxylic acid is approximately 60:40 by weight.

7. The process of claim 1 wherein the high molecular weight polyamide is polyhexamethylene adipamide.

8. The process of claim 1 wherein the first diamine is hexamethylene diamine.

9. The process of claim 1 wherein the first alkylene-dicarboxylic acid is adipic acid.